US008725890B2

(12) United States Patent
Liu et al.

(10) Patent No.: US 8,725,890 B2
(45) Date of Patent: May 13, 2014

(54) DATA RECOVERY IN HETEROGENEOUS NETWORKS USING PEER'S COOPERATIVE NETWORKING

(75) Inventors: Hang Liu, Yardley, PA (US); Saurabh Mathur, Monmouth Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 776 days.

(21) Appl. No.: 12/312,236

(22) PCT Filed: Oct. 31, 2006

(86) PCT No.: PCT/US2006/042716
§ 371 (c)(1),
(2), (4) Date: Apr. 30, 2009

(87) PCT Pub. No.: WO2008/054390
PCT Pub. Date: May 8, 2008

(65) Prior Publication Data
US 2009/0319824 A1 Dec. 24, 2009

(51) Int. Cl.
*G06F 15/16* (2006.01)
(52) U.S. Cl.
USPC .......................................................... 709/230
(58) Field of Classification Search
USPC .......................................................... 709/230
See application file for complete search history.

(56) References Cited

U.S. PATENT DOCUMENTS

| 5,859,959 | A | 1/1999 | Kimball et al. | |
|---|---|---|---|---|
| 2003/0135784 | A1* | 7/2003 | Yamaguchi et al. | 714/18 |
| 2004/0233866 | A1* | 11/2004 | Bossoli et al. | 370/328 |
| 2005/0022046 | A1* | 1/2005 | Cheng et al. | 714/4 |
| 2007/0005804 | A1* | 1/2007 | Rideout | 709/246 |

FOREIGN PATENT DOCUMENTS

| JP | 2002141856 A | 5/2002 |
|---|---|---|
| JP | 2002232434 A | 8/2002 |
| JP | 2004072551 A | 3/2004 |
| JP | 2004140663 A | 5/2004 |
| JP | 2007013824 A | 1/2007 |

OTHER PUBLICATIONS

Dow et al., "A Reliable Multicast Routing Protocol Based on Recovery Points in Mobile AD-HOC Networks,"2005 $2^{nd}$ Intl. Conference on Mobile Technology, Applications and Systems, Nov. 15-17, 2005, pp. 1-7.
International Search Report, dated Jul. 30, 2007.

* cited by examiner

*Primary Examiner* — Maceeh Anwari
(74) *Attorney, Agent, or Firm* — Robert D. Shedd; Jeffrey M. Navon; Catherine A. Cooper

(57) ABSTRACT

A method and apparatus for recovering data, comprising establishing a secondary recovery network with a device, detecting data loss and recovering via the secondary recovery network the lost data from the device, the device having correctly received the data, are described. The lost data was sent in a primary wireless multicast network. A method and apparatus for recovering data, comprising receiving data, establishing a secondary recovery network with device and recovering the lost data via said secondary recovery network, are also described. The received data was sent in a primary wireless multicast network.

26 Claims, 11 Drawing Sheets

DATA RECOVERY IN HETEROGENEOUS NETWORKS USING PEER'S COOPERATIVE NETWORKING

This application claims the benefit, under 35 U.S.C. §365 of International Application PCT/US2006/42716, filed on Oct. 31, 2006, which was published in accordance with PCT Article 21(2) on May 8, 2008, in English.

FIELD OF THE INVENTION

The present invention relates to networking and in particular to recovery of loss of multicast data.

BACKGROUND OF THE INVENTION

In multicast/broadcast over infrastructure-based/cellular wireless networks (e.g. 3G cellular networks, WiMax, WLANs or Digital Video Broadcasting (DVB)), data are transmitted to multiple receivers/wireless devices from a base station/access point/central station/host/server. In this specification, where "/" is used, it is intended to give alternative names or descriptions for the same component or device. That is, it is intended as the word "or". Compared to multiple unicast sessions of the same data to each receiver individually, multicast greatly improves the network efficiency to distribute data to multiple devices in wireless networks, especially thanks to the shared nature of wireless media (the data could be simultaneously received by any receiver within the sender's communication range). However, it is difficult to guarantee the receiving reliability of multiple multicast/broadcast receivers because the wireless links are unreliable and multiple receivers experience heterogeneous channel conditions. The multicast/broadcast services in many networks such as DVB and 3G multimedia broadcast/multicast services (MBMS) do not provide the reverse communications channel for the receivers to request the retransmission of lost data packets. Furthermore, the radio resource/bandwidth is generally expensive in infrastructure-based networks because the deployment is costly and the spectrum may be licensed. Therefore, it is a key and challenging task to support good quality of multicast service for the multiple receivers while efficiently utilizing radio resources and improve the throughput and coverage of the infrastructure-based/cellular wireless networks.

In many wireless multicast/broadcast systems, the forward error correction codes (FEC) are used within a packet at the physical layer to protect against multipath fading and interference and reduce packet errors. To recover the lost packets in wireless networks, the FEC codes are also applied across packets at the transport and application layers. However, wireless channel conditions are time-varying and multiple receivers in multicast environments experience heterogeneous channel conditions. In the prior art, FEC codes are used according to the worst channel conditions to ensure the receiving quality of all the receivers in the desired service area. This results in a large overhead and requires a great deal of radio resources in infrastructure-based multicast networks. Another prior art technique to improve reliability and throughput is to use multiple antennas. However, this approach incurs high cost and complexity to the wireless systems including the base station and wireless devices.

Recently there has been some work to improve the quality, throughput, and coverage of a cellular network with assistance of an ad hoc network. In a recently reported system, mobile stations with good link quality with the base station act as relays for stations with poor link quality with the base station. In this system, a single wireless interface is used for both relay and infrastructure modes. Thus, the total cell throughput achieved in this hybrid-mode network is bounded by the available cellular bandwidth. In another recently reported system, two types of wireless interfaces are used to integrate cellular and ad hoc networks, in which high-bandwidth wireless channels in ad hoc mode (IEEE 802.11) relay the unicast traffic of the cellular network (3G) for improving cellular throughput and coverage range. In yet another recently reported system, the multicast data is transmitted to a relay node over a short range within the cellular network (3G) and is forwarded to the remaining subscribing nodes by the relay node via high speed ad hoc networks (IEEE 802.11). All the above approaches use a relay node to forward the cellular traffic to the destination nodes via the ad hoc network whether the cellular network and the ad hoc network use a single wireless interface or two types of wireless interfaces. The downlink data is sent to the relay node from the base station and then forwarded to the destination nodes via a single or multi-hop path in the ad hoc network. The uplink data (if there is any) goes through a reverse path. That is, the destination nodes always receive or transmit data through the relay nodes in the ad hoc network path. In the above approaches, the relay node always helps the destination nodes. There is no cooperation between the nodes/wireless devices. This is not fair for the relay node. The relay node consumes much more CPU power and battery energy (if the relay node is operated by battery). The requirement for the ad hoc network resources such as bandwidth around the relay node is also high while the network resources in other portions of the ad hoc network may sit idle.

The problem solved by the present invention is how to design a system resilient to packet loss for high-quality multicast/broadcast services over wireless networks, and improve the throughput, quality, and coverage range of the infrastructure-based wireless networks. Thus, the present invention solves the above problems.

SUMMARY OF THE INVENTION

The present invention describes a method for the recovery of multicast data using an assistant/secondary/complimentary/ad hoc network. Wireless devices are connected to a principal network (e.g., cellular network) to receive multicast data. Some of these wireless devices (peers) form a secondary recovery network. Some multicast data may be lost to a wireless device. That is, one or more multicast devices may not receive some of the multicast data. The data may be lost or have errors or the wireless device may have not had good signal at the time the multicast data was transmitted. Some wireless devices may have correctly received the same multicast data (packets) from the principal network due to their spacial diversity and channel heterogeneity. The wireless devices recover their lost multicast data from their peers (the wireless devices that correctly received the multicast data) cooperatively via the secondary network. The method in the present invention, thus, improves the multicast reliability and quality of services for all the involved peers by taking advantages of the spatial diversity and cooperation of the peers (wireless devices/wireless receivers) to recover the lost multicast packets. It also extends the coverage of the principal network.

A method and apparatus for recovering data, comprising establishing a secondary recovery network with at least one device, detecting data loss and recovering via the secondary recovery network the lost data from the at least one device, the at least one device having correctly received the data, are described. In this case, the wireless device has lost data. A method and apparatus for recovering data, comprising receiving data, establishing a secondary recovery network with at least one device and recovering the lost data via said secondary recovery network, are also described. In this case, the wireless device has correctly received the data and is cooperatively helping a wireless device that has lost data to recover the lost data.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
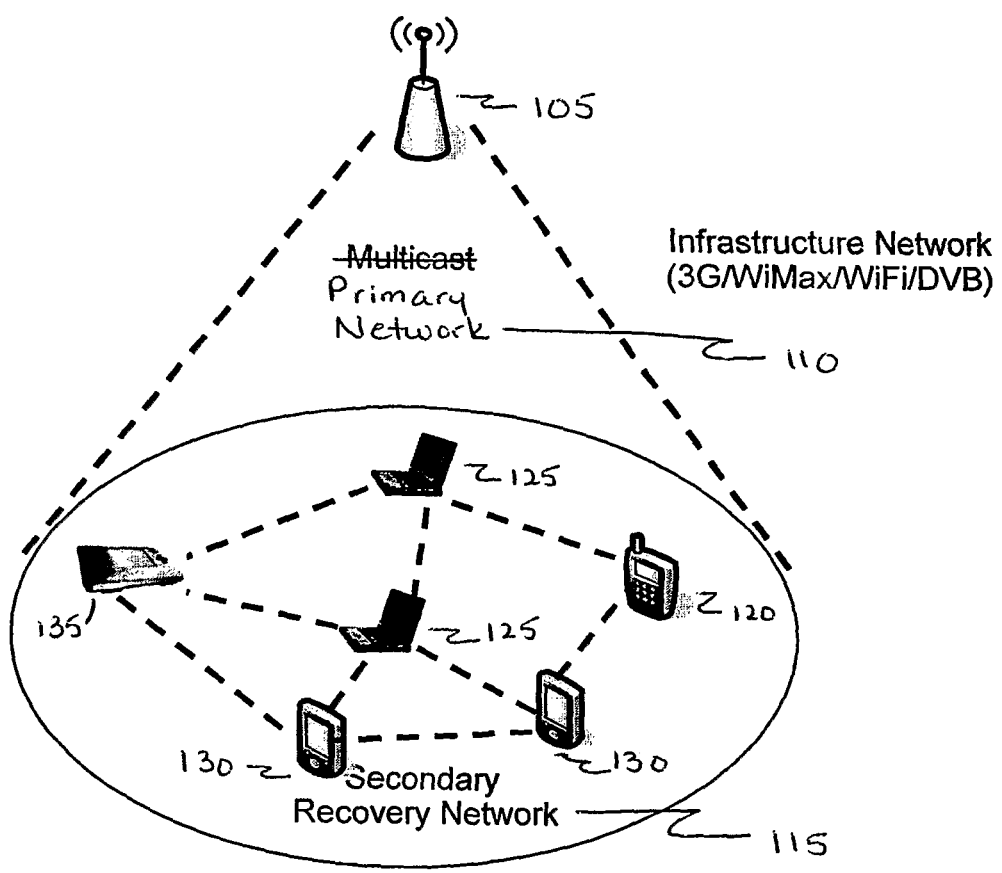
FIG. 1 is a schematic diagram of a system level architecture of a principal network and a secondary network in accordance with the principles of the present invention.

Referring to FIG. 1, which is a schematic diagram of a system level architecture of a principal network and a secondary network in accordance with the principles of the present invention. There are two wireless networks, a principal/primary/main/backhaul network 110 and an ad hoc/assistant/secondary/supplementary/recovery/complimentary network 115. The two networks co-exist. The principal network is an infrastructure-based/cellular wireless network with base stations/access points 105, for example, a 3G cellular network, WiMax, WiFi or DVB network. Wireless devices, such as cell/mobile phone 120, laptops 125, PDAs 130 and other mobile devices 135 receive multicast data from base station/access point/server 105 via principal network 110. The wireless devices also form secondary network 115. The secondary network 115 can be an ad hoc/mesh/secondary/cooperative network formed by the devices in a peer-to-peer architecture. As an example, the radio interface for the secondary network 115 can be IEEE 802.11 WiFi and WiMax. The principal network 110 provides downlink multicast/broadcast services, for example, video/audio streaming, video/audio on demand, and other multimedia services from the base stations/access points/hosts/servers 105 to the devices. The secondary network 115 improves the quality and transmission reliability of the multicast services provided by the principal network 110 by recovering the lost packets.

Wireless/mobile devices (e.g. laptops, personal digital assistants (PDAs), dual-mode phones) are components/members of both networks. In the present invention, a wireless device is equipped with two physical radio interfaces. One interface is connected to the backhaul/principal network and is responsible for receiving the downstream multicast data from the base station/access point. The other interface is connected to the secondary network and is used to recover the lost data packets of the principal network cooperatively from the peers via the secondary network.

In the case that the principal network and the secondary network use the same radio technologies, for example, IEEE 802.11, a wireless device may use a single physical interface. The single physical interface can be split/separated into two logical interfaces, one to access the principal network and the other to access the secondary network.

Wireless devices receive multicast data via their backhaul interfaces (interfaces to the principal network). Wireless devices form an ad hoc/mesh/cooperative/secondary network via their secondary interfaces and cooperate to recover the lost multicast data packets from the peers over the secondary network. A multicast data packet is lost to a wireless device, but may be correctly received by the other wireless device due to their spacial diversity and channel heterogeneity. If a wireless device has lost some multicast data packets via its backhaul interface, it recovers these lost packets from its peers via its secondary interface. One or more peers serve as recovery proxies for providing lost packets to other peers. In this way, the receiving quality of multicast services for all the peers is cooperatively improved.

Wireless devices can detect multicast data packet loss for a session received from the principal network according to the packet sequence number in the packet header. If a wireless device does not receive certain multicast data packets for a session from its principal interface, the wireless device will try to recover the lost data packets for this session from its partners (peers) via a secondary network formed of peers in the same principal network in accordance with the principles of the present invention.

Figure 2:
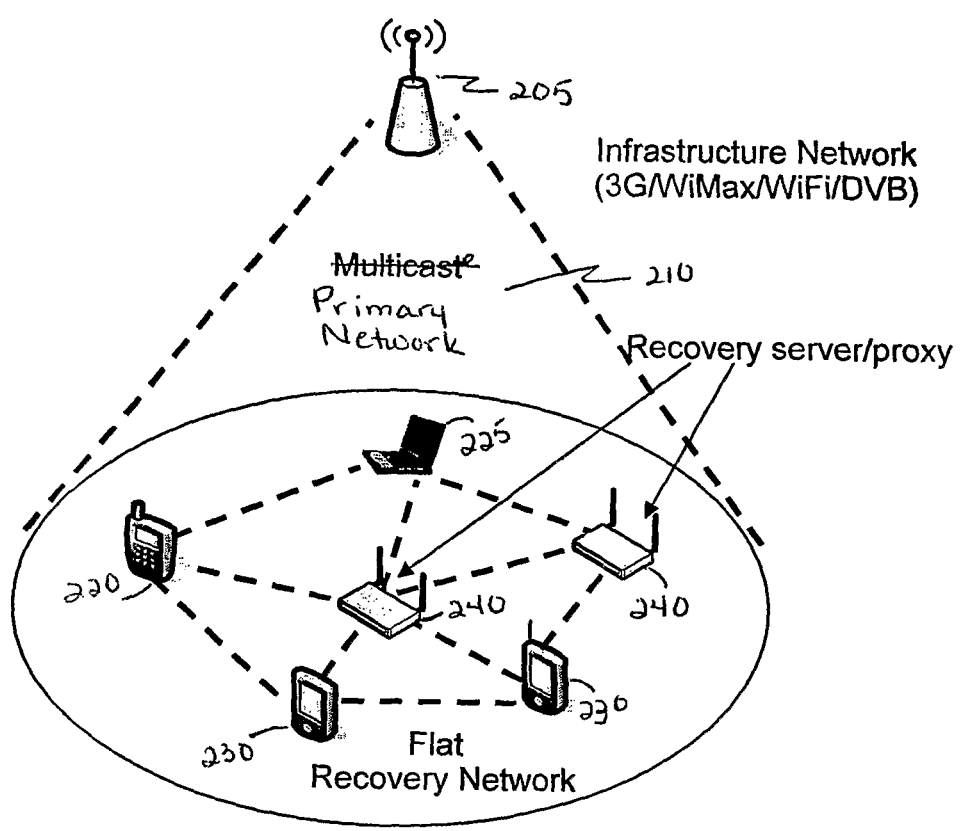
FIG. 2 is a schematic diagram of an alternative system level architecture embodiment of a principal network and a flat recovery network in accordance with the principles of the present invention.

In an alternative embodiment, dedicated recovery servers/proxies are deployed. These recovery servers/proxies are also equipped with two physical/logical radio interfaces, one for the principal network, the other used to join the assistant/supplementary network. The dedicated proxies receive the multicast data packets from the principal network and provide the lost packets to other peers over the secondary network. The dedicated proxies may not receive all the necessary data packets from the principal network. Referring to FIG. 2, there are two wireless networks, a principal/primary/main/backhaul network 210 and a flat recovery network 215. A flat recovery network is a form of secondary recovery network that uses recovery servers/proxies that are receivers within the secondary recovery network and are not at a higher level in any sort of network of their own. That is, the recovery servers/proxies are not tiered or hierarchical. A hierarchical network forms of secondary recovery network is described with respect to FIG. 3 below. The two networks co-exist. The principal network is an infrastructure-based/cellular wireless network with base stations/access points 205, for example, a 3G cellular network, WiMax, WiFi or DVB network. Wireless devices, such as cell/mobile phone 220, laptops 225, PDAs 230, dedicated recovery proxies/servers 240 and other mobile devices 235 receive multicast data from base station/access point/server 205 via principal network 210. The wireless devices also form secondary network 215. The secondary network 215 is a flat recovery network formed by the devices in a peer-to-peer architecture. As shown in FIG. 2, the dedicated proxies form a flat recovery/supplementary network with the wireless client devices. In the flat supplementary network, a proxy or a wireless client device recovers its own lost packets through proxies or through other wireless devices in the flat supplementary network.

Figure 3:
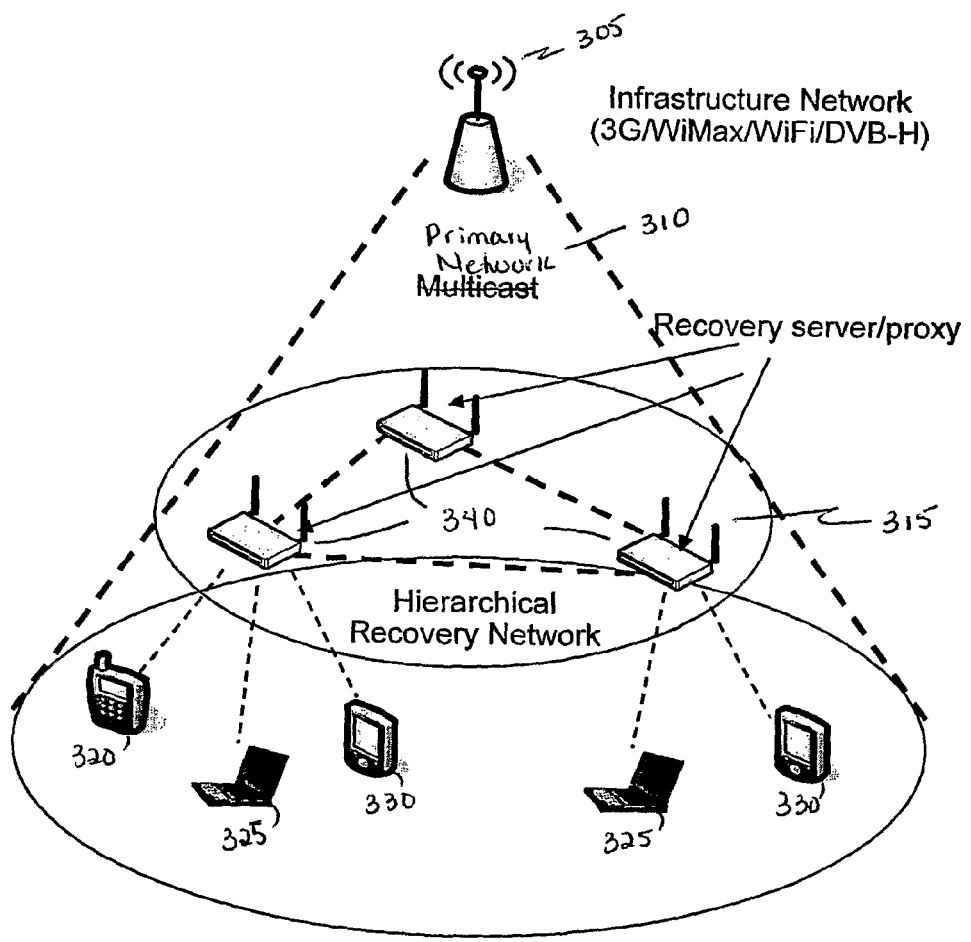
FIG. 3 is a schematic diagram of an alternative system level architecture embodiment of a principal network and a hierarchical recovery network in accordance with the principles of the present invention.

In an alternative embodiment, it is also possible that a hierarchical supplementary network is formed by the proxies and the wireless devices. Referring to FIG. 3, there are two wireless networks, a principal/primary/main/backhaul network 310 and a hierarchical recovery network 315. The two networks co-exist. The principal network is an infrastructure-based/cellular wireless network with base stations/access points 305, for example, a 3G cellular network, WiMax, WiFi or DVB network. Wireless devices, such as cell/mobile phone 320, laptops 225, PDAs 330, dedicated recovery proxies 340 and other mobile devices 335 receive multicast data from base station/access point/server 305 via principal network 310. The wireless devices also form secondary network 315. The secondary network 315 is a hierarchical recovery network formed by the devices in a peer-to-peer architecture. In the hierarchical supplementary network, a proxy 340 recovers its own lost packets through other proxies. A wireless client device recovers its lost packets from one or more recovery proxies.

In order to recover the lost packets from its peers, the wireless devices need to discover, establish and maintain a cooperative partnership with their peers via the secondary network. A wireless device that has lost or not received packets also needs to detect and request the lost packets, and further recover the lost packets from the peers.

In the present invention a control mechanism and procedures for partnership discovery, establishment, and maintenance are described. Methods and procedures for detecting, requesting and recovering the lost packets are also described.

Figure 4:
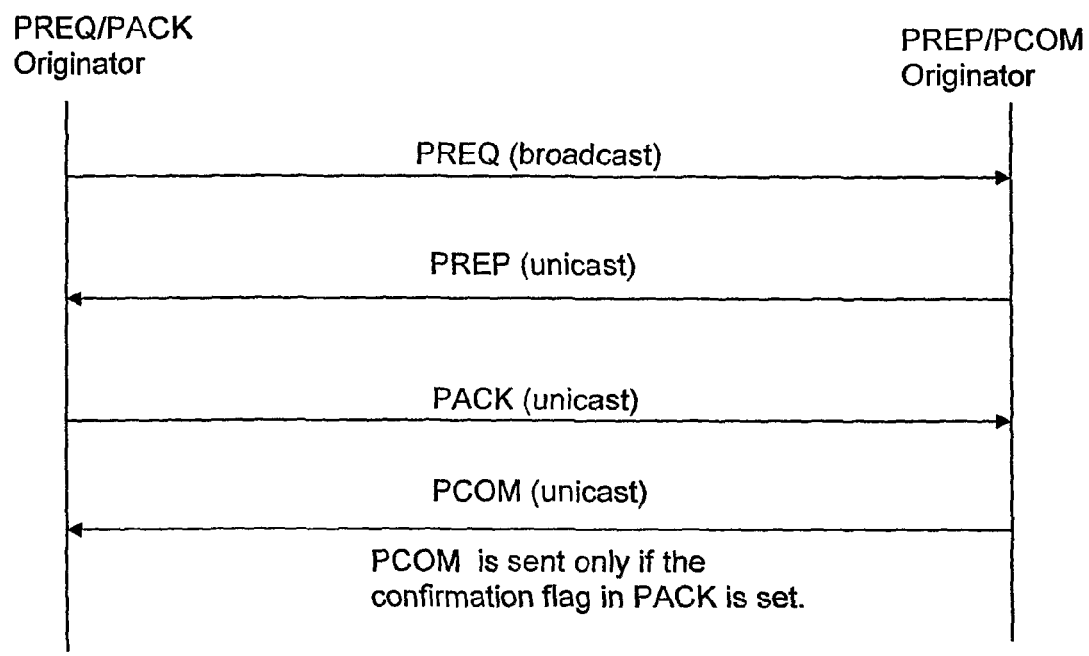
FIG. 4 is a ladder diagram of the partnership formation method in accordance with the present invention.

Referring to FIG. 4, a wireless device sends a partnership/peer request message (PREQ) in multicast/broadcast via its secondary network interface when it determines that it needs to discover and establish the partnership with other peers. As an example, the PREQ message contains the source address, destination address, the PREQ message ID, the session ID for cooperative recovery, the time-to-live (TTL), etc. The source address is the IP (layer 3) or MAC (layer 2) address of the PREQ originator for its secondary network interface. The destination address is the IP or MAC multicast/broadcast destination address of this message in the secondary network. The time-to-live field indicates the number of hops that the PREQ message will propagate in the secondary network. The session ID for cooperative recovery identifies the multicast session in the principal network for which the PREQ originator wants to recover its lost packets through the cooperation of the peers (or a recovery proxy) over the secondary network. As an example, it may be the source and destination IP addresses and UDP/TCP ports of the multicast data packets for the session in the principal network, which identifies the session to which the packets belong. MAC (layer 2) addresses of the multicast data packets for the session in the principal network may also be used. It may be the other ID (for example, Real-time Transport Protocol Synchronization Source ID) carried in the multicast data packets, which identifies the session that the packets belong to in the principal network.

When a wireless device receives a PREQ message on its secondary network interface, it determines whether it will become a partner candidate of the PREQ originator for the requested session. The decision can be made by the PREQ receiver based on the policy of the PREQ receiver. For example, the policy may depend on whether the PREQ receiver has enough processing power, battery power and bandwidth in the secondary network, whether the PREQ receiver is receiving the same session from the principal network for its own use or has enough processing power, battery power, good channel quality and bandwidth to receive the requested session from the principal network for just serving as a recovery proxy to provide the lost packets to other peers. The PREQ receiver updates the TTL field in the PREQ message by reducing its value by one. If the updated value of TTL field is greater than zero, the PREQ receiver forwards/broadcasts the PREQ message to its neighbors in the secondary network. If the updated value of the TTL field becomes zero, it discards the PREQ message.

Furthermore, if the PREQ receiver wants to be a partner candidate with the PREQ originator for the recovery of the lost packets of the session specified in the PREQ message, it sends a partnership/peer reply (PREP) message in unicast to the PREQ originator. If the PREQ receiver does not want to be the partner, it does not send the PREP. As an example, the PREP message contains the source and destination addresses, the original PREQ message ID, the PREP message ID, the session ID, etc. The source address is the address of the device responding to the PREQ and the destination address is the address of the PREQ originator, i.e. the address for which the PREP message is destined. If the PREQ receiver has already established a partnership with the PREQ originator for the recovery of the lost packets of the session specified in the PREQ message, it ignores this PREQ message.

After the PREQ originator, i.e. the PREP destination device, receives a PREP message from the PREP originator that the PREP originator is a potential partnership candidate, the PREQ originator will decide whether to form a partnership with this PREP originator. The PREQ originator sends a partnership/peer acknowledgement (PACK) message in unicast to the PREP originator to approve or deny the partnership. As an example, the PACK message may contain the layer 2 or layer 3 source and destination addresses, the original PREP message ID, the PACK message ID, the session ID, an acknowledge flag and a confirmation flag, etc. The acknowledge flag indicates whether this PACK is a positive acknowledge (the PACK destination, i.e. the PREP originator, is selected as a partner by the PACK (PREQ) originator) or a negative acknowledge (the PACK destination is not selected as a partner). The confirmation flag indicates whether the PACK destination is required to send a partnership/peer confirmation (PCOM) message back.

After the PREP destination receives a PREP message from the PREP originator, if the PREP destination wants to form a partnership with this PREP originator, it sends a PACK with a positive acknowledgement flag to this PREP originator. If the PREP does not want to form a partnership with this PREP originator, it may send a PACK with a negative acknowledge flag to this PREP originator or may not send a PACK message to this PREP originator.

After the PACK destination device receives the PACK message, it sends a partnership/peer confirmation (PCOM) message in unicast to the PACK originator if the confirmation flag is set in the PACK message. As an example, the PCOM message contains the layer 2 or layer 3 source and destination addresses of the PCOM message, the original PACK message ID, the PCOM message ID, the session ID, etc. The PCOM message is used in case the lower layer transport protocol does not have a reliable end-to-end transport mechanism (e.g. UDP). When the lower layer does not provide transport reliability, the PACK originator may set the confirmation flag in the positive PACK message that it sends. If the lower layer provides a reliable transport mechanism (e.g. TCP), it may depend on the lower layer to deliver the PACK message successfully. The confirmation flag in the PACK may not be set. The PCOM message will not be sent if the confirmation flag is not set in PACK. After these messages are successfully exchanged, the partnership between the originator of the PACK and the destination of PACK is established. After the partnership is established, in order to recover the lost packets of the session from the peers over the secondary network, both peers cache the data packets of the specified session received from the principal interface.

All the control messages described above are transmitted in the recovery/secondary network. Note that a wireless device may receive multiple copies of the same PREQ message, which is propagated in multicast/broadcast through different paths in the secondary network. The device only propagates the first copy of the PREQ message. The device replies to the first copy of the PREQ message with a PREP message if it decides to be a partner candidate for the PREQ originator for the specific session.

The above control messages may be lost. After sending a PREQ, a wireless device waits for the PREP. If no PREP is received within a PREQ_RETRIES_INTERVAL or the number of received PREP originators (i.e. the number of partner candidates) is less than the desired number of partners, the wireless device may try again to send another PREQ in the secondary network for discovering one or more partners. The wireless device increments and updates the PREQ message ID for each retry. The wireless device may start with a value of TTL_START, in the first PREQ message and then increase the TTL value by TTL_INCREMENT in the PREQ message for each retry until the TTL value reaches TTL_MAXIMUM. The maximum TTL value in a PREQ message can be TTL_MAXIMUM, which is the estimated value of the secondary network size. The wireless device may try up to a maximum number of PREQ_RETRIES_LIMIT times after the TTL value reaches TTL_MAXIMUM in the PREQ message.

A PACK originator waits for a PCOM after it sends the PACK message with the confirmation flag set. The PACK originator may retransmit a PACK message with a new PACK message ID in the secondary network if a PCOM is not received within a PACK_RETRIES_INTERVAL. The message ID is incremented and updated in the PACK message for each retry. The PACK originator may retransmit a PACK message up to a maximum number of PACK_RETRIES_LIMIT times if the expected PCOM message is not received.

The PREQ_RETRIES_INTERVAL, PREQ_RETRIES_LIMIT, TTL_START, TTL_INCREMENT, TTL_MAXIMUM, PACK_RETRIES_INTERVAL and PACK_RETRIES_LIMIT are configured at the wireless device.

A wireless device may establish a cooperative partnership with one or more partners for recovering a session. If the number of the partners is less that the desired number of partners, the wireless device may try to discover and establish more partners using the above method periodically. The desired number of partners can be configured at the wireless device. The period to discover new partners is also configured at the wireless device. Any peer in the partnership may terminate the partnership by sending a Partnership Termination (PTER) message to the other peer.

The flowchart four figures detail the operations in the PREQ/PACK originator and the PREP/PCOMM originator in accordance with the ladder diagram of FIG. 4. In each case the flowchart terminates with a "STOP". This is not intended to indicate a complete cessation of operations but a completion of the particular portion of the entire process. The completion of a particular portion of the process may indicate that a suspended or wait state is in effect.

Figure 5:
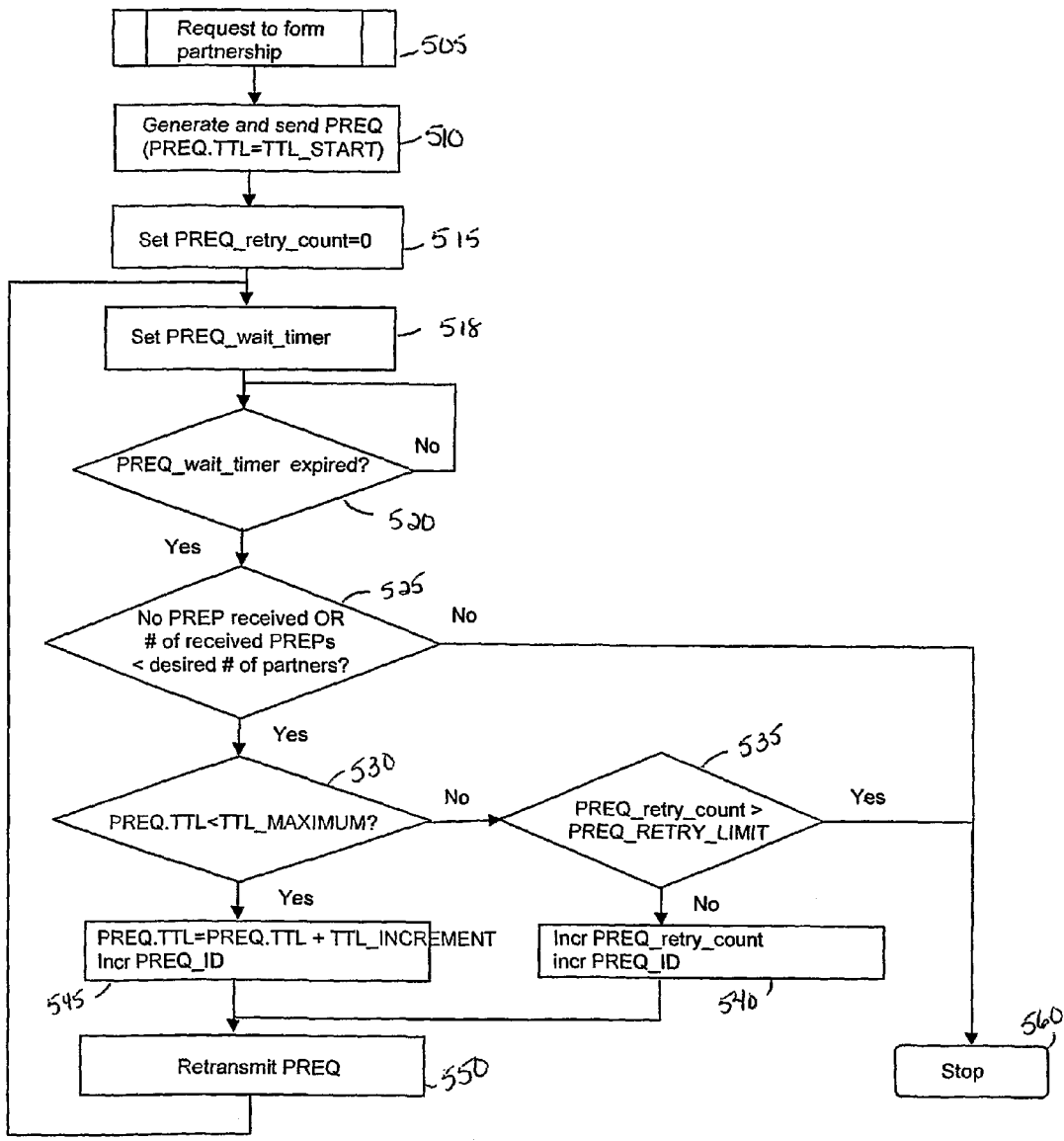
FIG. 5 is a flowchart of the method of sending a request to form a partnership in accordance with the present invention.

FIG. 5 is a flowchart of the method of sending a request to form a partnership. A partnership request message is generated and sent to peers/recovery servers/recovery proxies to form a secondary network at 505 so that the wireless device/requester can recover lost or erroneously received data/packets. The TTL is set to an initial value (TTL_START) and the PREQ is generated and sent at 510. The retry count is initialized at 515. The wait timer (PREQ_wait-timer) is set at 518. A test is performed at 520 to determine if the wait timer (PREQ_wait-timer) for the request to form a partnership has expired. If the PREQ_wait_timer has not expired the test at 520 continues to be performed until the PREQ_wait_timer has expired. If the PREQ_wait_timer has expired then a test is performed at 525 to determine if no reply (PREP) has been received or if less than the desired number of potential partner (peers/recovery servers/recovery proxies) candidates has responded. If the desired number of partners has responded (PREPS have been received) then the process proceeds to 560 and the recovery process can proceed. If the desired number of potential partners has not responded then a test is performed at 530 to determine if the TTL (PREQ_TTL) is less than the maximum TTL (TTL_MAXIMUM). If the PREQ_TTL is not less than the maximum TTL then a test is performed at 535 to determine if the PREQ retry count (PREQ_retry_count) is greater than the PREQ retry limit (PREQ_RETRY_LIMIT). If the PREQ retry count is greater than the PREQ_RETRY_LIMIT then the process proceeds to 560 and the process comes to an end because the retry count has been exceeded. If the PREQ retry count is less than the PREQ_RETRY_LIMIT then the PREQ retry count (PREQ_retry_count) is incremented (by one) as is the PREQ_ID. The process then proceeds to 550 where the partnership request (PREQ) is retransmitted. If the PREQ TTL is less than the TTL maximum then at 545 the PREQ TTL is incremented by TTL_INCREMENT and the PREQ_ID is increased by one. The process then proceeds to 550 where the partnership request (PREQ) is retransmitted.

Figure 6:
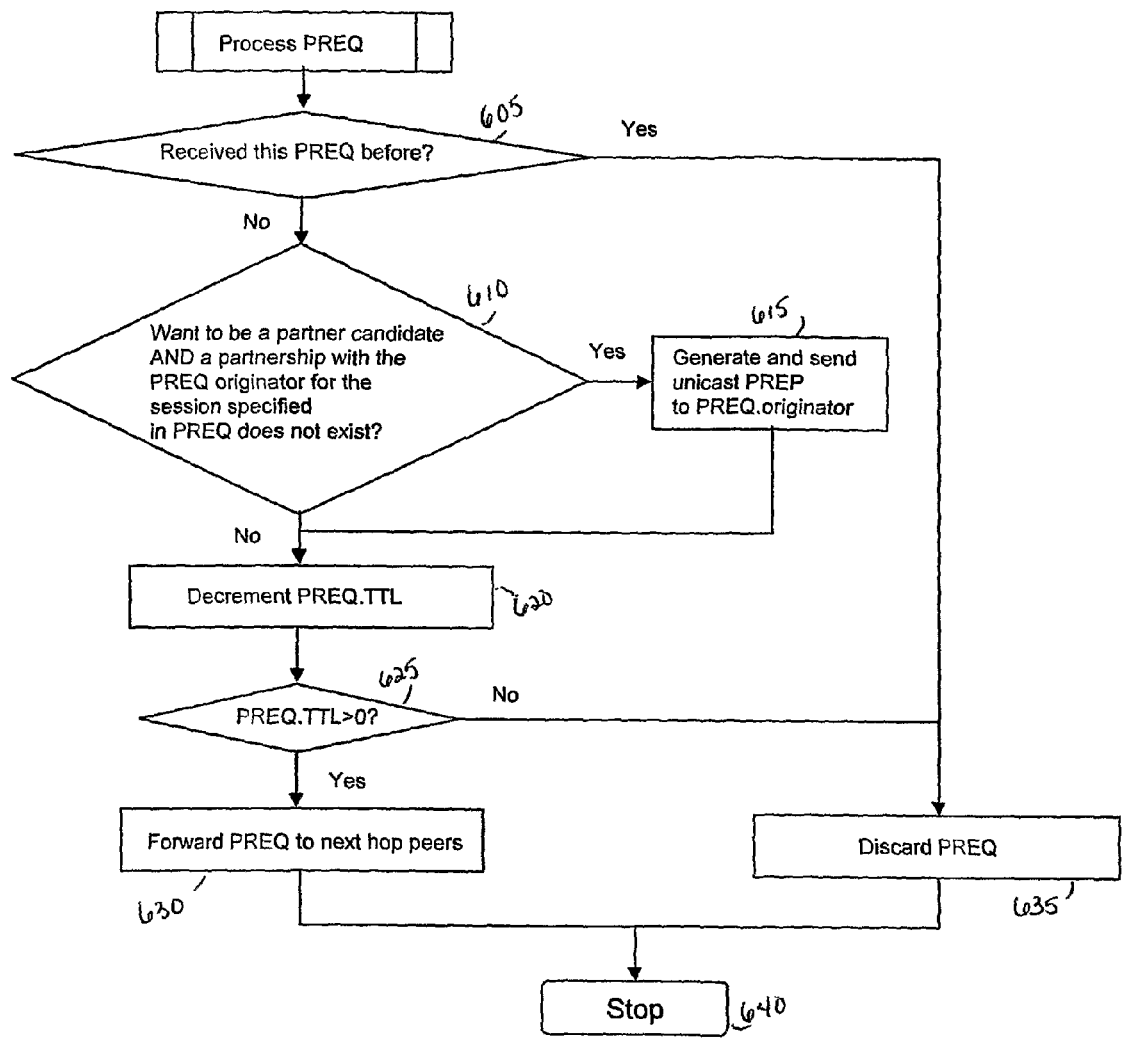
FIG. 6 is a flowchart of the method of processing a partnership request message in accordance with the present invention.

FIG. 6 is a flowchart of the method of processing a partnership request message. The functionality covered by the flowchart of FIG. 6 is performed by a potential partner/peer/recovery server/recovery proxy responding to the request to form a partnership. The potential partner first performs a test at 605 to determine if it has received this partnership request (PREQ) before. If the potential partner has not received this PREQ before then it determines at 610 if it wants or can be a partner with the wireless device/requester and that a partnership does not already exist for the specified session. If the potential partner wants to and can form a partnership with the wireless device/requester and the specified session does not already exist then the potential partner generates and sends a partnership request reply (PREP) to the PREQ originator at 615. The process then proceeds to 620 where the PREQ TTL is decremented (by one). If the potential partner does not want to or cannot form a partnership with the wireless device/ requester or the specified session already exists then the PREQ TTL is decremented (by one) at 620. The PREQ is forwarded to other potential partners. The process then proceeds to 640 for the partnership establishment process to continue. If the potential partner has received this PREQ before then the PREQ is discarded at 635. Processing then proceeds to 640.

Figure 7:
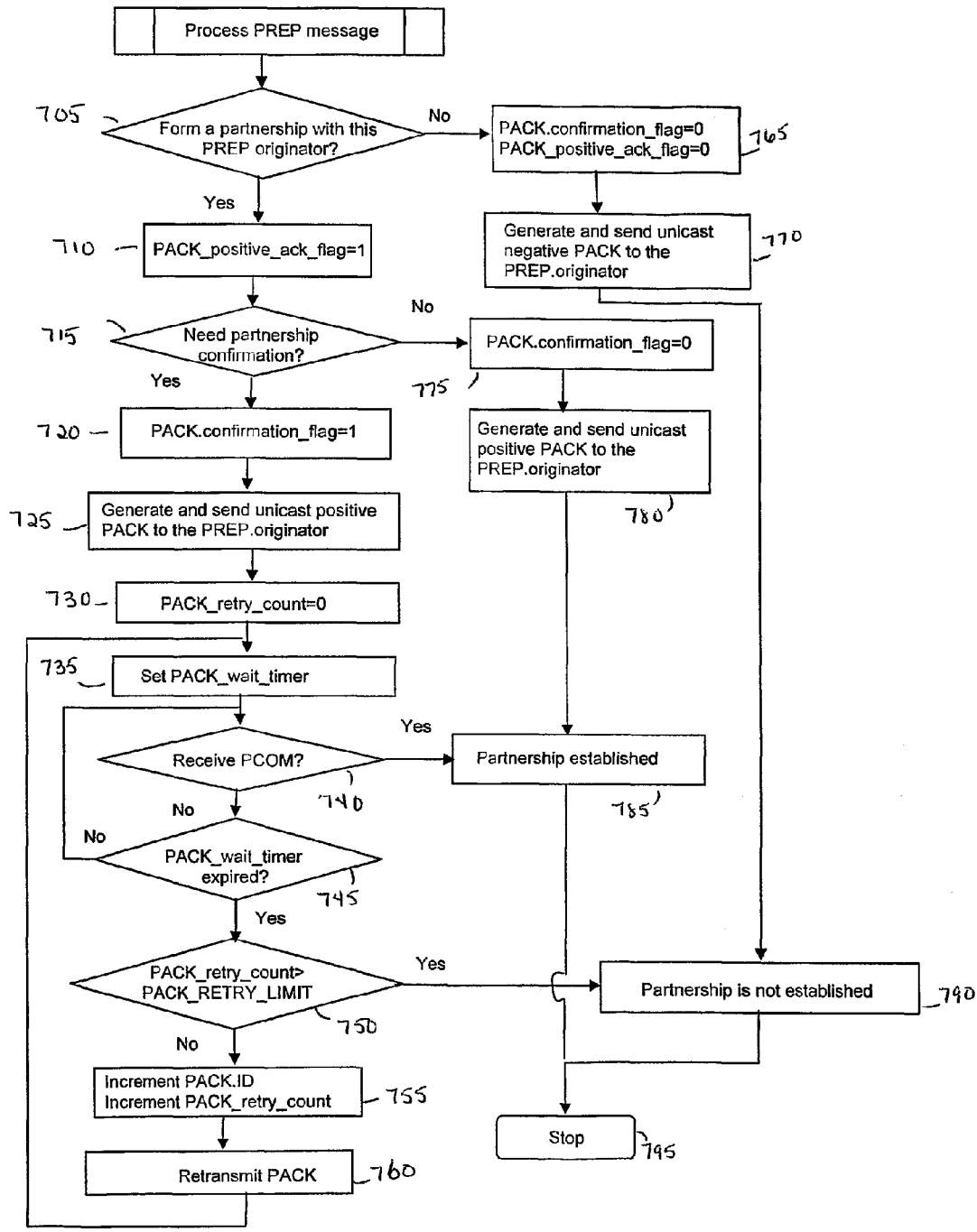
FIG. 7 is a flowchart of the method of processing a partnership reply message in accordance with the present invention.

FIG. 7 is a flowchart of the method of processing a partnership reply message in accordance with the present invention. The functionality covered by the flowchart of FIG. 7 is performed by the wireless device/requester (PREQ originator). The processing is in response to the receipt of a partnership request reply (PREP). A test is performed at 705 to determine if the PREQ originator wants to form a partnership with the potential partner who responded with a PREP to the request to form a partnership with the PREQ requester. If the PREQ requester wants to form a partnership with the potential partner then the partnership positive acknowledgement flag (PACK_positive_ack_flag) is positively set at 710. A test is then performed at 715 to determine if partnership confirmation is needed. IF partnership confirmation is needed then a partnership confirmation flag is set (PACK.confirmation_flag) at 720. The PREQ originator then generates and sends a positive partnership acknowledgement (PACK) in unicast to the potential partner (PREP originator) at 725. The partnership retry count (PACK_retry_count) is then initialized at 730. The partnership acknowledgement wait time (PACK_wait_timer) is then set at 735. A test is then performed at 740 to determine if the partnership confirmation (PCOM) has been received. If the partnership confirmation has not been received then a test is performed at 745 to determine if the partnership acknowledgement wait time (PACK_wait timer) has expired. If the PACK_wait_timer has expired then a test is performed at 750 to determine if the partnership retry count (PACK_retry_count) is greater than the partnership retry limit (PACK_RETRY_LIMIT). If the PACK_retry_count is less than the PACK_RETRY_LIMIT then the partnership acknowledgement id (PACK_ID) and the PACK_retry_count are incremented (by one) at 755. The partnership acknowledgement (PACK) is then retransmitted at 760.

If the PREQ requester does not want to form a partnership with the potential partner then the partnership positive acknowledgement flag (PACK_positive_ack_flag) is cleared and the partnership confirmation flag (PACK_confirmation_flag) is cleared at 765. The PREQ requester then generates and sends a negative partnership acknowledgement in unicast to the potential partner/PREP originator at 770. This results in the partnership not being established at 790. The process then proceeds to 795.

If a partnership confirmation is not needed (715) then the partnership acknowledgement confirmation flag (PACK_confirmation_flag) is cleared at 775. The PREQ originator then generates and sends a partnership positive acknowledgement to the potential partner (PREP originator) at 780. The partnership is thereafter established at 785. The process then proceeds to 795.

If the partnership acknowledgment retry count (PACK_retry_count) is greater than the partnership acknowledgement retry limit (PACK_RETRY_LIMIT) then the partnership is not established at 790.

Figure 8:
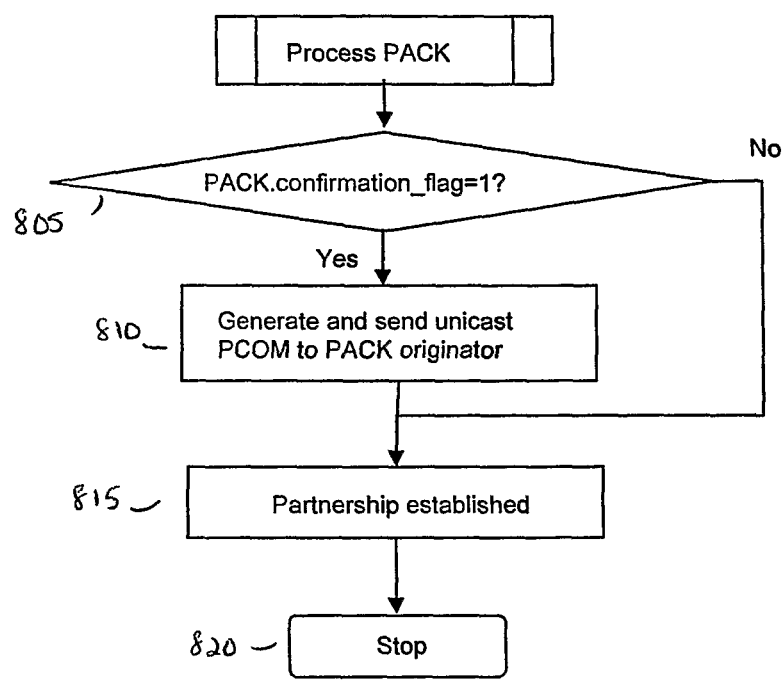
FIG. 8 is a flowchart of the method of processing a partnership acknowledgement message in accordance with the present invention.

FIG. 8 is a flowchart of the method of processing a partnership acknowledgement message in accordance with the present invention. The functionality covered in the flowchart of FIG. 8 is performed by the potential partner/PREP originator. A test is performed at 805 to determine if the partnership confirmation flag (PACK_confirmation_flag) has been set. If the PACK_confirmation_flag has been set then the potential partner/PREP originator generates and sends a partnership confirmation to the PREQ requester/PACK originator at 810. The partnership is thereafter established at 815. If the PACK_confirmation_flag has not been set then the partnership is thereafter established at 815. The process then proceeds to 820 whereupon the recovery of lost or erroneously received data/packets proceeds.

Figure 9:
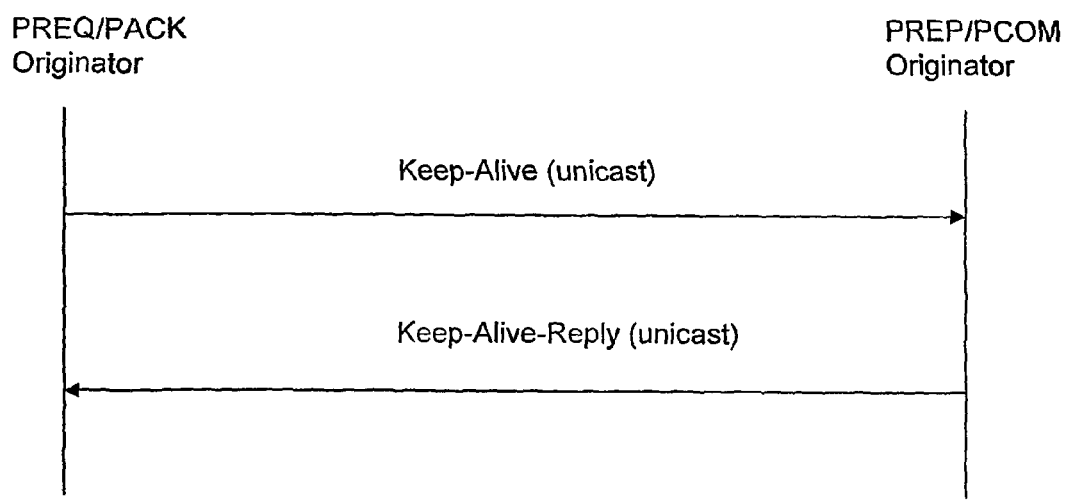
FIG. 9 is a ladder diagram of the partnership maintenance method in accordance with the present invention.

Referring to FIG. 9, after a partnership is established between two devices, a Keep-Alive (KA) message is sent periodically in an interval of KA_INTERVAL from the PREQ originator to the peer in unicast to maintain the partnership. As an example, the Keep-Alive message contains the layer 2 or layer 3 source and destination addresses of the KA message, the keep-alive message ID, the session ID, the time-to-live (TTL), etc. The peer replies with a Keep-Alive-Reply (KAR) message in unicast to the KA/PREQ originator after the KA message is received. As an example, the KAR message contains the layer 2 or layer 3 addresses of the source and destination of this KAR message, the original KA message ID, the KAR message ID, the session ID, etc. If a KAR message is not received within a KAR_TIMEOUT after the KA message is sent. The PREQ/KA originator retransmits a KA message with a new KA message ID. The PREQ/KA originator may retransmit a keep-alive message for a maximum number of KEEP_ALIVE_RETRIES_LIMIT times if the KAR message is not received from the peer. If the KAR message is still not received from the peer after the maximum number of retransmissions has been reached, the KEEP_ALIVE originator (i.e. the PREQ originator) assumes that the partnership with this peer is ended. The KEEP_ALIVE originator may find a replacement partner using the above described partnership discovery and establishment procedure. If a peer with an established partnership with the PREQ/KA originator has not received the keep-alive message from the PREQ/KA originator for a time interval of KEEP_ALIVE_LIMIT, it assumes the partnership with the PREQ/KA originator is ended. The KA_INTERVAL, KAR_TIMEOUT, KEEP_ALIVE_RETRIES_LIMIT, and KEEP_ALIVE_LIMIT can be configured at the wireless device.

Figure 10:
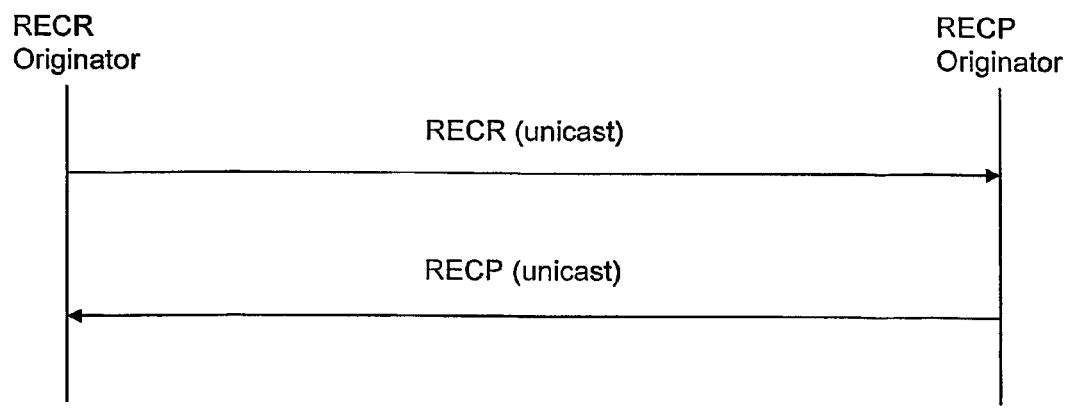
FIG. 10 is a ladder diagram of the lost packet recovery method in accordance with the present invention.

Referring to FIG. 10, a lost packet recovery method is illustrated. The mobile device sends a RECovery Request (RECR) message in unicast to one or multiple of its partners via its secondary/assistant/supplementary network. Partners can be other wireless devices (peers) or dedicated recovery proxies/servers. The secondary network can be a supplementary network, a flat recovery network or a hierarchical recovery network. As an example, the RECR message contains the layer 2 or layer 3 source address, layer 2 or layer 3 destination address, the session ID, the RECR message ID, the requested packet map or list. The requested packet map or list identifies the packets that the RECR originator requests from the partner(s). After receiving the RECR message, the partner determines which requested packets it can offer. The partner sends a RECover rePly (RECP) message to the RECR originator. As an example, the RECP message contains the layer 2 or layer 3 source and destination addresses, the session ID, the original RECR message ID, and the offered packet map or list. The offered packet map or list identifies the packets that this partner can offer. The partner also sends the offered packets to the RECR originator. If the partner can not offer all the requested packets, the RECR originator can send a RECR to one or more other partners with an updated packet request map or list.

Figure 11:
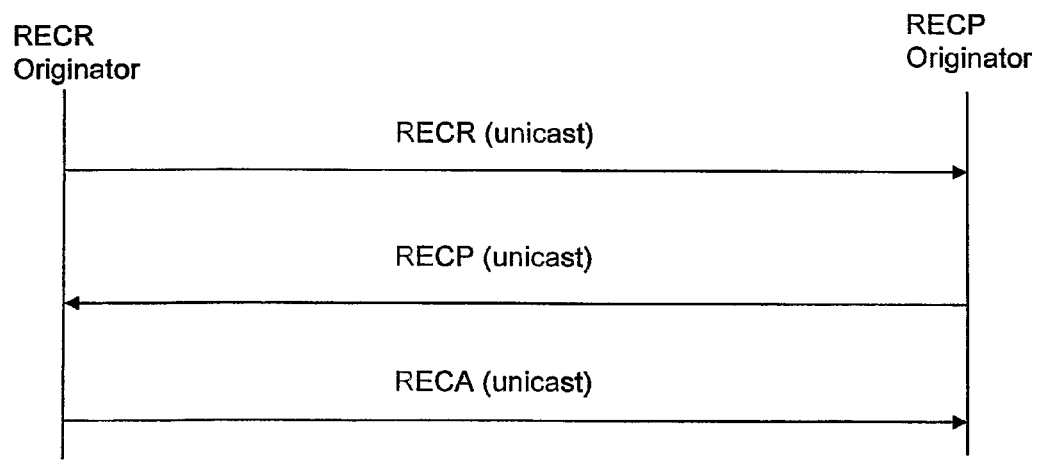
FIG. 11 is a ladder diagram of an alternative embodiment lost packet recovery method in accordance with the present invention.

Referring to FIG. 11, an alternative recovery method is illustrated. If a wireless device does not receive certain multicast data packets for a session from its principal interface, it will try to recover the lost data packet in this session from its partners via its secondary/assistant/supplementary network. The wireless device sends a recovery request (RECR) message to one or more of its partners. Partners can be other wireless devices (peers) or dedicated recovery proxies/servers. The secondary network can be a supplementary network, a flat recovery network or a hierarchical recovery network. As an example, the RECR message contains the layer 2 or layer 3 source address, layer 2 or layer 3 destination address, the session ID, the RECR message ID, the requested packet map or list. The requested packet map or list identifies the packets that the RECR originator requests from the partner(s). After receiving the RECR message, a partner determines which requested packets it can offer. The partner sends a recover reply (RECP) message to the RECR originator. As an example, the RECP message contains the layer 2 or layer 3 source and destination addresses, the session ID, the original RECR message ID, and the offered packet map or list. The offered packet map or list identifies the packets that this partner can offer. The RECR originator determines which lost packets are recovered from a specific partner according to the offered packet map or list in the RECP message from this partner. If more than one partner can offer the same packet, the RECR originator may determine the partner to obtain this packet based on other criteria such as the path quality from the partner in the secondary network. The RECR originator then sends a recovery acknowledgement (RECA) message to the partner from which it wishes to receive the lost packets or subset of lost packets. As an example, the RECA message contains the layer 2 or layer 3 source address, layer 2 or layer 3 destination address, the session ID, the RECA message ID, the packet map or list. The packet map or list identifies the packets requested from this partner. The partner sends the requested packets to the RECR originator. If the partners cannot offer all the requested packets, the RECR originator can send a RECR to other partners with an updated packet request map or list.

Figure 12:
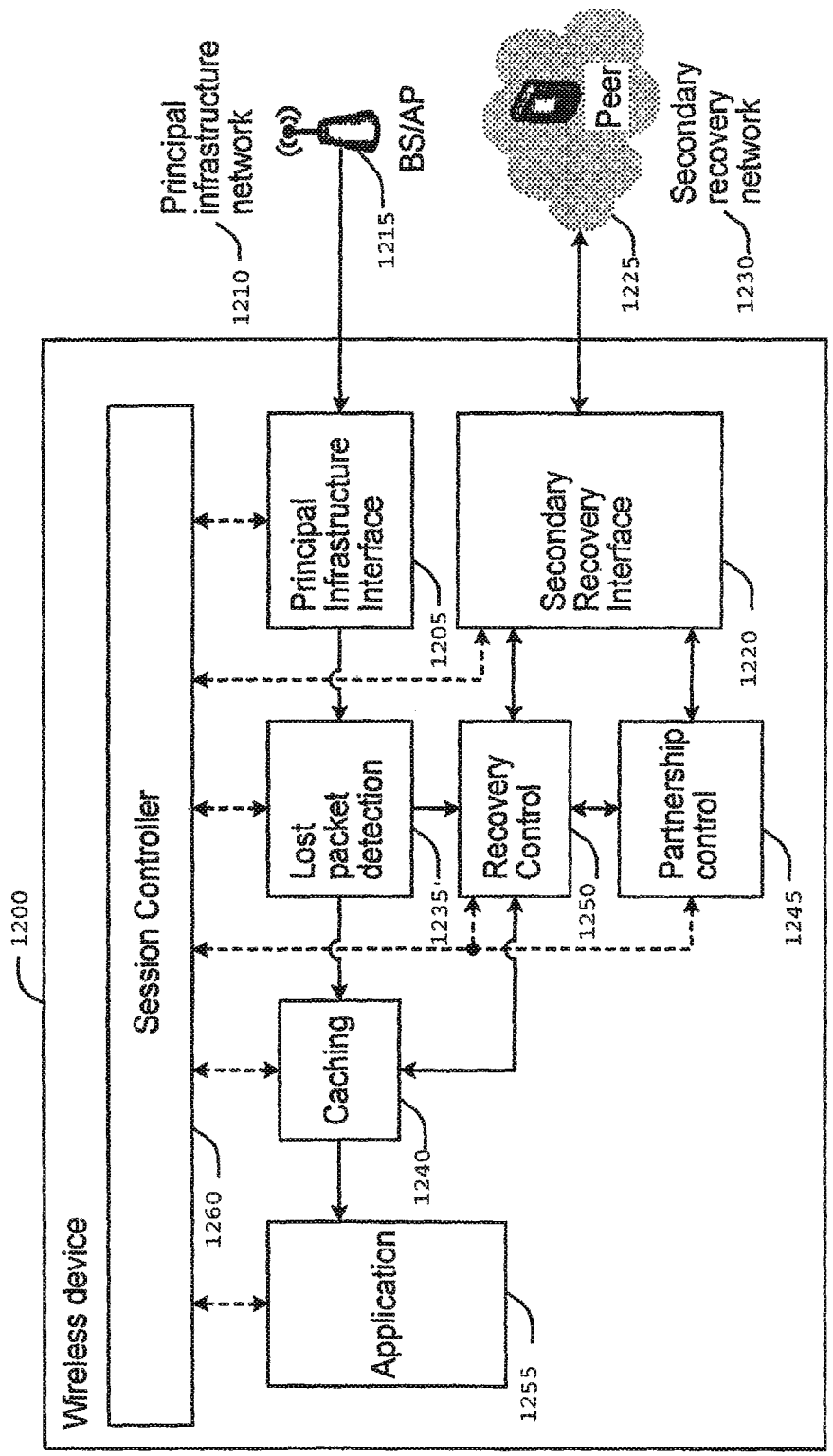
FIG. 12 is a block diagram illustrating the wireless device in accordance with the present invention.

Referring to FIG. 12, a block diagram illustrates the wireless device 1200 in accordance with the present invention. The wireless device 1200 has two physical/logical interfaces. The principal interface 1205 communicates with the principal network 1210 to receive the multicast data packets for a session from the base station/access point 1215. The secondary interface 1220 communicates with the peers/recovery servers/recovery proxies 1225 to form a secondary network (flat recovery network/hierarchical recovery network) 1230 and recovers the lost data packets of the multicast session from the peers/recovery servers/recovery proxies 1225 over the secondary network 1230. The lost packet detection module 1235 detects the loss of the multicast packets received from the principal network. The caching module 1240 caches the data packets. The partnership control module 1245 forms the partnership with the peers/recovery servers/recovery proxies 1225 in the secondary network 1230. The recovery module 1250 recovers the lost data packets from the peers/recovery servers/recovery proxies 1225 over the secondary network 1230 and inserts the recovered packets into the cache. The application 1255 is the application using the multicast data packets.

The session controller 1260 coordinates the modules so it is in control communication with the application 1255, caching module 1240, partnership control module 1245, recovery module 1250, lost packet detection module 1235, secondary interface module 1220 and principal interface module 1205. The secondary interface is therefore, in communication with peers/recovery servers/recovery proxies 1225 of the secondary network 1230, recovery module 1250, partnership module 1245 and session controller 1260. The principal interface module 1205 is in communication with the base station/access point 1215 of the principal network 1210, the lost packet detection module 1235 and the session controller 1260. The lost packet detection module 1235 is in communication with the principal interface module 1205, the recovery control module 1250, the caching module 1240 and the session controller 1260. The recovery control module 1250 is in communication with the secondary interface module 1220, the lost packet detection module 1235, the partnership control module 1245, the caching module 1240 and the session controller 1260. The partnership control module 1245 is in communication with the recovery control module 1250, the secondary interface module 1220 and the session controller 1260. The caching module 1240 is in communication with the recovery module 1250, the lost packet detection module 1235, the application 1255 and the session controller 1260. The application is in communication with the caching module 1240 and the session controller 1260.

In another alternative embodiment, the method of the present invention can also be used for recovering the data packets of a unicast session in the principal network. Wireless media is a shared media. When the data/packets for a unicast session are transmitted in the principal network from the base station/access point to a wireless device, or from the wireless device to the base station/access point, the packets/data can be overheard by other devices within the sender's communication range. A packet is lost to a wireless device, but may be correctly received by the other wireless devices due to their spacial diversity and channel heterogeneity. The wireless devices can form the partnership and cooperatively recover the lost packets of the principal network unicast sessions from each other through an secondary network using the methods of the present invention. In another embodiment, the base station/access point can become part of the secondary network, form the partnership with the wireless devices, and recover the lost packet of the principal network unicast sessions through the secondary network using the method in the present invention.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for recovering multicast data, said method comprising:
    establishing a partnership with a recovery device of a secondary recovery network;
    detecting data loss;
    recovering, via said secondary recovery network, said lost data from said recovery device, wherein said establishing act further comprises:
        generating and transmitting a request to form said partnership with said recovery device, wherein said partnership with said recovery device creates and establishes said secondary recovery network;
        receiving a unicast reply to said request to form said partnership;
        determining if said partnership with said recovery device is formed; and
        generating and transmitting a positive partnership acknowledgment in unicast if said partnership is formed
    maintaining said partnership with said recovery device in said secondary recovery network and further wherein said maintaining act further comprises:
    periodically generating and transmitting a message in unicast designed to maintain said partnership with said recovery device; and
    receiving a unicast reply to said maintenance message.

2. The method according to claim 1, wherein said establishing act further comprises
    generating and transmitting a negative partnership acknowledgment in unicast if said partnership is not formed.

3. The method according to claim 2, wherein said request to form said partnership includes an indication of a session for which recovery is conducted if data is lost in said session.

4. The method according to claim 1, wherein said recovering act further comprises:
    transmitting a message in unicast requesting data recovery to said recovery device forming said secondary recovery network; and
    receiving a unicast reply to said message requesting data recovery from said recovery device, wherein said reply includes a list of data packets available from said recovery device and said available data packets.

5. The method according to claim 1, wherein said recovering act further comprises:
    generating and transmitting a message in unicast requesting data recovery to said recovery device forming said secondary recovery network;
    receiving a unicast reply to said message requesting data recovery from said recovery device, wherein said reply includes a list of data packets available from said recovery device;
    generating and transmitting an acknowledgment in unicast to said reply; and
    receiving said available data packets in unicast.

6. method for recovering multicast data, said method comprising:
    receiving data;
    establishing a partnership with a wireless device of a secondary recovery network;
    recovering data lost by said wireless device via said secondary recovery network, wherein said establishing act further comprises:
        receiving a request to form said partnership with said wireless device, wherein said partnership with said wireless device creates and establishes said secondary recovery network;
        determining if said request has been previously received;
        discarding said request if said request has been previously received;
        determining if said partnership is formed;
        generating and transmitting a partnership reply in unicast to said request to form said partnership, if said partnership is formed; and
        forwarding said request to form a partnership to neighboring devices if said request to form a partnership has not expired;
    maintaining said partnership with said wireless device in said secondary recovery network and further wherein said maintaining act further comprises:
    periodically receiving a unicast message designed to maintain said partnership with said wireless device; and
    generating and transmitting a reply in unicast to said maintenance message.

7. The method according to claim 6, wherein said establishing act further comprises
    discarding said request to form a partnership if said request to form a partnership has expired.

8. The method according to claim 7, wherein said request to form said partnership includes an indication of the lost data from a session.

9. The method according to claim 6, wherein said recovering act further comprises:
    receiving a unicast message requesting data recovery from said wireless device via said secondary recovery network, wherein said message includes a list of lost data packets;
    generating and transmitting a unicast reply to said message requesting data recovery to said wireless device, wherein said reply includes a list of said lost data packets available; and
    transmitting said available lost data packets to said wireless device.

10. The method according to claim 6, wherein said recovering act further comprises:
    receiving a message in unicast requesting data recovery via said secondary recovery network, wherein said message includes a list of lost data packets;
    generating and transmitting a unicast reply to said message requesting data recovery, wherein said reply includes a list of lost data packets available;
    receiving an acknowledgment in unicast to said reply, wherein said acknowledgement includes a list of lost data packets; and
    transmitting said available lost data packets in unicast.

11. An apparatus for recovering multicast data, comprising:
    means for establishing a partnership with a recovery device of a secondary recovery network;
    means for recovering lost data via said secondary recovery network, wherein said apparatus is a wireless device and wherein said recovery device is one of a proxy, a recovery server and a recovery proxy, wherein said means for establishing further comprises a partnership control module for controlling partnership formation with said recovery device of said secondary recovery network, wherein said partnership control module further comprises:

means for generating and transmitting a request to form a partnership with said recovery device, wherein said partnership with said recovery device creates and establishes said secondary recovery network;
means for receiving a unicast reply to said request to form said partnership;
means for determining if forming said partnership with said recovery device is formed; and
means for generating and transmitting a positive partnership acknowledgment in unicast if said partnership is formed
means for maintaining said partnership with said recovery device in said secondary recovery network wherein said means for maintaining further comprises:
means for periodically generating and transmitting a message in unicast designed to maintain said partnership with said recovery device; and
means for receiving a unicast reply to said maintenance message.

12. The apparatus according to claim 11, wherein said means for establishing and said means for recovering communicate with said recovery device of said secondary recovery network includes two physical radio interfaces.

13. The apparatus according to claim 11, wherein said means for establishing and said means for recovering communicate with said recovery device of said secondary recovery network includes two logical radio interfaces.

14. The apparatus according to claim 11, further comprising means for detecting data loss.

15. The apparatus according to claim 14, wherein said partnership control module further comprises
means for generating and transmitting a negative partnership acknowledgment in unicast if said partnership is not formed.

16. The apparatus according to claim 15, wherein said request to form said partnership includes an indication of a session for which recovery is conducted if data is lost in said session.

17. The apparatus according to claim 14, wherein said partnership control module further comprises:
means for receiving a request to form a partnership with said recovery device, wherein said partnership with said recovery device creates and establishes said secondary recovery network;
means for determining if said request has been previously received;
means for discarding said request if said request has been previously received;
means for determining if a partnership is to be formed;
means for generating and transmitting a partnership reply in unicast to said request to form said partnership, if said partnership is to be formed;
means for forwarding said request to form a partnership to neighboring devices if said request to form a partnership has not expired; and
means for discarding said request to form a partnership if said request to form a partnership has expired.

18. The apparatus according to claim 17, further comprising means for transmitting a positive unicast confirmation.

19. The apparatus according to claim 17, further comprising means for maintaining said partnership with said recovery device in said secondary recovery network and wherein said means for maintaining further comprises:
means for periodically receiving a unicast message designed to maintain said partnership with said recovery device; and
means for generating and transmitting a reply in unicast to said maintenance message.

20. The apparatus according to claim 11, wherein said means for recovering further comprises a recovery control module and further wherein said recovery control module comprises:
means for transmitting a message in unicast requesting data recovery to said recovery device forming said secondary recovery network; and
means for receiving a unicast reply to said message requesting data recovery from said device, wherein said reply includes a list of data packets available from said recovery device and said available data packets.

21. The apparatus according to claim 11, wherein said means for recovering further comprises a recovery control module and further wherein said recovery control module further comprises:
means for generating and transmitting a message in unicast requesting data recovery to said recovery device forming said secondary recovery network;
means for receiving a unicast reply to said message requesting data recovery from said recovery device, wherein said reply includes a list of data packets available from said recovery device;
means for generating and transmitting an acknowledgment in unicast to said reply; and
means for receiving said available data packets in unicast.

22. The apparatus according to claim 11, wherein said means for recovering further comprises a recovery control module and wherein said recovery control module further comprises:
means for receiving a unicast message requesting data recovery from said recovery device forming said secondary recovery network, wherein said message includes a list of lost data packets;
means for generating and transmitting a unicast reply to said message requesting data recovery, wherein said reply includes a list of lost data packets available and transmitting said available lost data packets.

23. The apparatus according to claim 11, wherein said means for recovering further comprises a recovery control module and wherein said recovery control module further comprises:
means for receiving a message in unicast requesting data recovery via said secondary recovery network, wherein said message includes a list of lost data packets;
means for generating and transmitting a unicast reply to said message requesting data recovery, wherein said reply includes a list of said lost data packets available;
means for receiving an acknowledgment in unicast to said reply, wherein said acknowledgement includes a list of requested lost data packets; and
means for transmitting said available lost data packets in unicast.

24. A method for recovering multicast data, said method comprising:
establishing a secondary recovery network with a recovery device,
detecting data loss in a primary wireless multicast network;
recovering via said secondary recovery network said lost data from said recovery device, wherein said establishing act further comprises:
generating and transmitting a request to form said partnership with said recovery device, wherein said partnership with said recovery device creates and establishes said secondary recovery network;

receiving a unicast reply to said request to form said partnership;

determining if said partnership with said recovery device is formed; and generating and transmitting a positive partnership acknowledgment in unicast if said partnership is formed maintaining said partnership with said recovery device in said secondary recovery network and further wherein said maintaining act further comprises:

periodically generating and transmitting a message in unicast designed to maintain said partnership with said recovery device; and receiving a unicast reply to said maintenance message.

25. A method for recovering multicast data, said method comprising:

receiving data in a primary wireless multicast network;

establishing a secondary recovery network with a recovery device, recovering data lost by said recovery device via said secondary recovery network, wherein said establishing act further comprises:

receiving a request to form said partnership with said wireless device, wherein said partnership with said wireless device creates and establishes said secondary recovery network;

determining if said request has been previously received; and discarding said request if said request has been previously received;

determining if said partnership is formed;

generating and transmitting a partnership reply in unicast to said request to form said partnership, if said partnership is formed; and forwarding said request to form a partnership to neighboring devices if said request to form a partnership has not expired maintaining said partnership with said wireless device in said secondary recovery network and further wherein said maintaining act further comprises:

periodically receiving a unicast message designed to maintain said partnership with said wireless device; and generating and transmitting a reply in unicast to said maintenance message.

26. An apparatus for recovering multicast data, comprising:

means for establishing a partnership with a recovery device of a secondary recovery network;

means for recovering data lost from a primary wireless multicast network via said secondary recovery network, wherein said apparatus is a wireless device and wherein said recovery device is one of a proxy, a recovery server and a recovery proxy, wherein said means for establishing further comprises a partnership control module for controlling partnership formation with said recovery device of said secondary recovery network, wherein said partnership control module further comprises:

means for generating and transmitting a request to form a partnership with said recovery device, wherein said partnership with said recovery device creates and establishes said secondary recovery network;

means for receiving a unicast reply to said request to form said partnership;

means for determining if forming said partnership with said recovery device is formed; and means for generating and transmitting a positive partnership acknowledgment in unicast if said partnership is formed means for maintaining said partnership with said recovery device in said secondary recovery network wherein said means for maintaining further comprises:

means for periodically generating and transmitting a message in unicast designed to maintain said partnership with said recovery device; and means for receiving a unicast reply to said maintenance message.

* * * * *